(12) United States Patent
Maus et al.

(10) Patent No.: US 8,439,064 B2
(45) Date of Patent: May 14, 2013

(54) SAFETY VALVE FOR A COMPRESSED GAS RESERVOIR

(75) Inventors: Steffen Maus, Reutlingen (DE); David Wenger, Ulm (DE); Patrick Wilde, Weilheim (DE)

(73) Assignee: Daimler AG, Stuttgart (DE)

( * ) Notice: Subject to any disclaimer, the term of this patent is extended or adjusted under 35 U.S.C. 154(b) by 293 days.

(21) Appl. No.: 12/920,431

(22) PCT Filed: Feb. 27, 2009

(86) PCT No.: PCT/EP2009/001401
§ 371 (c)(1),
(2), (4) Date: Nov. 19, 2010

(87) PCT Pub. No.: WO2009/109331
PCT Pub. Date: Sep. 11, 2009

(65) Prior Publication Data
US 2011/0057138 A1    Mar. 10, 2011

(30) Foreign Application Priority Data

Mar. 1, 2008 (DE) .......................... 10 2008 012 139
Apr. 12, 2008 (DE) .......................... 10 2008 018 561

(51) Int. Cl.
*F16K 17/38* (2006.01)
*G05D 16/10* (2006.01)

(52) U.S. Cl.
USPC ...... 137/74; 137/79; 137/505.25; 137/599.16

(58) Field of Classification Search .................. 137/72, 137/74, 79, 505.25, 599.09, 599.16, 625.3, 137/625.33
See application file for complete search history.

(56) References Cited

U.S. PATENT DOCUMENTS

| 4,783,043 A * | 11/1988 | Koerber ................... 137/505.13 |
| 5,427,151 A * | 6/1995 | Pauley ..................... 137/505.25 |
| 5,513,708 A | 5/1996 | Sundholm |
| 7,677,262 B2 | 3/2010 | Maus et al. |
| 7,757,710 B2 * | 7/2010 | Larsen et al. ............ 137/505.25 |
| 2005/0067025 A1 | 3/2005 | Ricco et al. |
| 2005/0205133 A1 * | 9/2005 | Schneider ................ 137/505.25 |

FOREIGN PATENT DOCUMENTS

| DE | 600 23 955 T2 | 5/2006 |
| DE | 10 2006 020 388 A1 | 10/2007 |
| EP | 1 521 022 A1 | 4/2005 |
| EP | 1 655 533 A1 | 5/2006 |
| EP | 1 830 115 A1 | 9/2007 |
| FR | 2 273 562 A | 1/1976 |

OTHER PUBLICATIONS

International Search Report including partial English translation dated Jun. 8, 2009 (Fifteen (15) pages).

* cited by examiner

*Primary Examiner* — John Rivell
(74) *Attorney, Agent, or Firm* — Crowell & Moring LLP

(57) ABSTRACT

A safety valve for a compressed gas reservoir has an exhaust duct that is connected to the compressed gas reservoir, and a sealing element, which is arranged to move within the exhaust duct, and selectively opens the exhaust duct to the outside depending on an operating phase. The exhaust duct has a greater cross-sectional area on the side facing away from the compressed gas reservoir than on the side facing the compressed reservoir, and a constriction on the side of the sealing element facing away from the compressed reservoir.

16 Claims, 1 Drawing Sheet

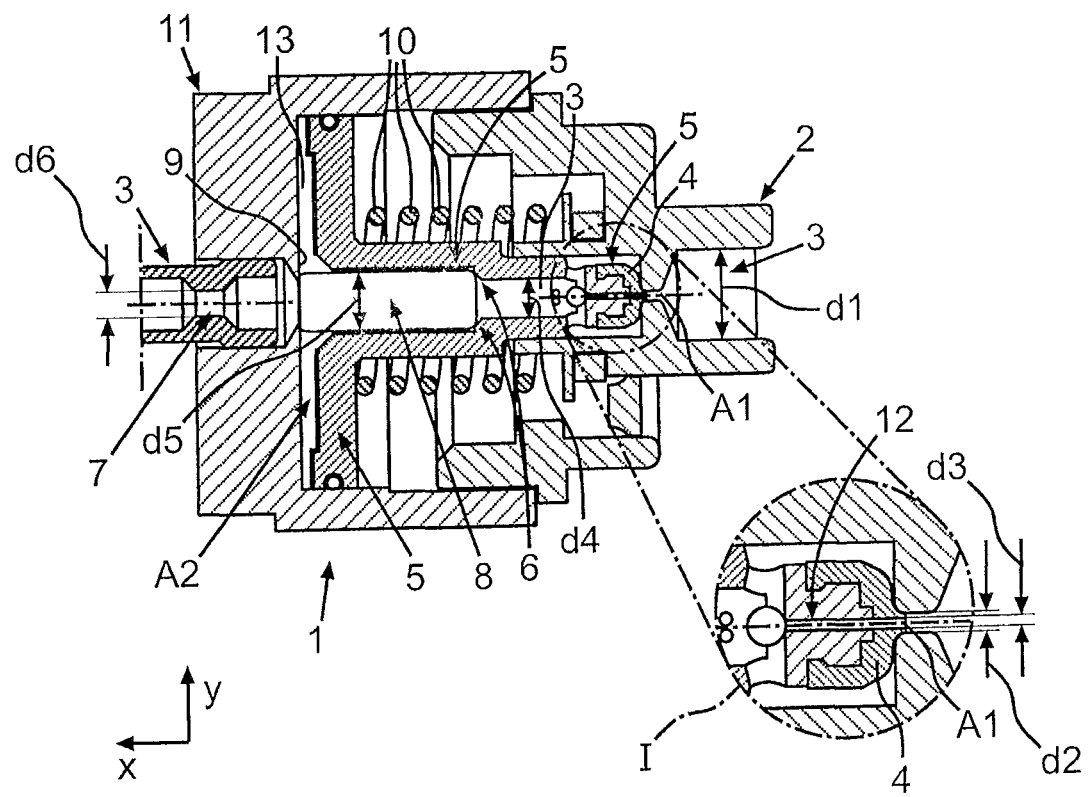

SAFETY VALVE FOR A COMPRESSED GAS RESERVIOR

This application is a national stage of PCT International Application No. PCT/EP2009/001401, filed Feb. 27, 2009, which claims priority under 35 U.S.C. §119 to German Patent Application Nos. 10 2008 012 139.8, filed Mar. 1, 2008 and 10 2008 018 561.2, filed Apr. 12, 2008, the entire disclosures of which are herein expressly incorporated by reference.

BACKGROUND AND SUMMARY OF THE INVENTION

The present invention relates to a safety valve for a compressed gas reservoir, with an exhaust duct which is connected to the compressed gas reservoir, and a sealing element which is arranged to move within the exhaust duct and which opens the exhaust duct to the outside depending on the operating phase.

A safety valve of this general type is disclosed in German patent document DE 10 2006 020 388 A1. Furthermore, a safety valve for a compressed gas reservoir is known from European patent document EP 1 655 533 A1, in which the sealing element is formed with cross-sectional surfaces of different sizes at the ends, and the sealing element is furthermore pre-tensioned with a spring and can be moved back and forth axially.

An exhaust process, in particular the exhaust of hydrogen contained in the compressed gas reservoir, can take place only in a very insufficient manner with the known safety valves. In particular, the requirement of a constant mass flow during the exhaust process is satisfied only in a very unreliable manner.

One object of the present invention, therefore is to provide a safety valve for a compressed gas reservoir, in which a constant mass flow can be exhausted more reliably during an exhaust process.

This and other objects and advantages are achieved by the safety valve for a compressed gas reservoir according to the invention, which comprises an exhaust duct connected to the compressed gas reservoir. A sealing element, which is arranged to move within the exhaust duct and opens it to the outside depending on the operating phase, has a greater cross-sectional area on the side facing away from the compressed gas reservoir than on the side facing the compressed gas reservoir. The exhaust duct is formed with a constriction on the side of the sealing element facing away from the compressed reservoir. With such a safety valve, the exhaust of a constant mass flow during an exhaust process can be achieved in a considerably more precise manner and virtually without fluctuations.

The constriction is preferably formed in such a manner that the cross section of the exhaust duct is greater at the constriction than before and behind it. The constriction or the narrow point is thus designed in such a manner that a widening of the flow cross section is given again in the flow direction on both sides of the constriction. This contributes to keeping the mass flow to be exhausted constant in a particularly preferred manner.

The constriction is preferably formed in the exhaust direction of the medium and thus in the flow-out direction of the medium behind the sealing element in the exhaust duct. This enables a particularly suitable application locally and functionally with regard to the mass flow to be exhausted in a constant manner.

The exhaust duct is in particular formed with a section in the exhaust direction of the medium in front of the constriction, which section has a flow cross section that is smaller than a flow cross section of the exhaust duct in front or behind this section. Narrow points are thus formed in the exhaust duct at both sides of the safety valve, whereby the adjustment of a highly precise constant mass flow during an exhaust process can be achieved in a particularly advantageous manner.

This section is preferably formed as a bore in the sealing element, in particular in the end part of the sealing element facing the compressed gas reservoir.

The end portion of the sealing element preferably has the smaller cross-sectional surface of the sealing element, which is larger than the surface of the flow cross section of the section of the exhaust duct.

The sealing element is preferably a piston that can be displaced in the axial direction.

The sealing element is preferably held in its starting position with a sealing and locking element lying on the inside. The starting position is defined if an exhaust process is not carried out and the sealing element is thus held in this starting position in a positionally stable manner. The sealing and locking element has the function of sealing the exhaust duct on the one hand, if an exhaust process is not carried out, and has the locking of the sealing element in this starting position, if an exhaust process is not carried out.

The sealing and locking element is filled with a liquid in a advantageous manner. The activation of the sealing and locking element can be achieved by this design in a particularly simple manner, and with little effort in safety-critical situations, so that it is destroyed.

It can in particular be provided in this connection that the sealing and locking element loses its sealing and locking function in dependence on a temperature charge, in particular the temperature charge of the liquid. It is hereby provided in particular that the liquid evaporates during heating and expands thereby, which leads to a bursting of the sealing and locking element and the sealing function and the locking function is thus lost, whereby the sealing element can be moved from its starting position.

The sealing and locking element is in particular a cylindrical capsule, in particular of glass or a glass-like material, which is filled with a liquid evaporating at a high temperature. A high temperature in this connection is meant to be such a temperature which can for example be present with safety-critical states in which a fire occurs. The temperature increase of the liquid caused by the fire then leads to the evaporation and the destruction of the sealing and locking element.

The sealing and locking element preferably extends into the interior of the sealing element in its assembly position and abuts a housing wall with a first end projecting from a section of the exhaust duct formed in the sealing element, and abuts a projection of the inner wall, which is formed for reducing the flow cross section of the exhaust duct at the inner wall with a second end arranged in the sealing element. This is a particularly advantageous, and with regard to the function, a particularly suitable positioning. Furthermore, this specific position of the sealing and locking element can be generated and kept in a simple manner by the specific formation of the exhaust duct in the sealing element and the positioning of the sealing element.

The sealing and locking element is preferably arranged in the exhaust direction of the medium to be exhausted between the constriction and the section of the exhaust duct with a reduced cross section.

The sealing element is in particular coupled to a pre-tensioning element, such as a spring, for the movement guide during the exhaust process. The movement of the sealing element can thus be adjusted continuously and in a very exact manner in dependence on the formed pressure states, so that undesired large fluctuations of the mass flow to be exhausted can also be changed in this regard.

The compressed gas reservoir is in particular formed for receiving fuel, in particular hydrogen or gas containing hydrogen, of a fuel cell system Safety problems can be provided especially in the case of fire by means of the suggested safety valve, as it can be prevented that very high mass flows exit from the exhaust line. High fluctuations of the medium to be exhausted can furthermore also be prevented. This is in particular achieved by means of a mechanical valve, in which the mass flow to be exhausted during the exhaust process can be kept constant independently of the primary pressure.

Other objects, advantages and novel features of the present invention will become apparent from the following detailed description of the invention when considered in conjunction with the accompanying drawings.

BRIEF DESCRIPTION OF THE DRAWINGS

The single FIGURE shows an embodiment of a safety valve according to the invention, in a schematic sectional view.

DETAILED DESCRIPTION OF THE DRAWINGS

The safety valve 1 is formed for the dosed exhaust of hydrogen, or gas containing hydrogen, in safety-critical states of a fuel cell system, wherein this gas to be exhausted is contained in a compressed gas reservoir of the fuel cell system. The compressed gas reservoir (not shown) is connected to the safety valve 1, either via a line (not shown) or directly. A connection of the safety valve at the side 2 facing the compressed gas reservoir, which represents the high pressure side, is given in this connection.

The safety cell 1 is associated with a fuel cell system, preferably a mobile fuel cell system which is arranged in a vehicle. The device according to the invention is however also suitable for stationary compressed gas reservoirs.

The safety valve 1 comprises an exhaust duct 3, which extends through the safety valve 1 and which has different sections. It has an inner diameter d1 in a first section, which is greater than an inner diameter d2 connected thereto (see section I). An end part 4 of a sealing element 5 formed as a piston extends in this section with the inner diameter d2. This sealing element 5 can be moved back and forth in the interior of the safety valve 1 in the axial (x) direction.

The sealing element 5 has a cross-sectional surface A1 at its end part 4 facing the compressed gas reservoir, which surface is smaller than a cross-sectional surface A2 at the opposite end. The surface dimensioning of the cross-sectional surfaces A1 and A2 is such that the cross-sectional surface A2 is much larger than the cross-sectional surface A1 can practically be neglected when viewing the surfaces compared to the cross-sectional surface A2. The exhaust duct 3 also extends in the interior of the sealing element 5, wherein it is realized by a very small bore at the end 4 facing the compressed gas reservoir in this connection, as is shown in the enlarged section I of the FIGURE. This section 12 of the exhaust duct in the end part is realized by a bore which has an inner diameter d3, which is smaller than the inner diameter d2. This section 12 of the exhaust duct 3 is dimensioned in such a manner, in particular in its length and its inner diameter d3, that the compressed gas reservoir is emptied in 2 to 10, (preferably in 2 to 5) minutes.

The exhaust duct 3 is formed subsequent to this section 12 in the end part, such that it has again a larger interior measure d4 than the inner measure d3. The exhaust duct 3 is then widened again in the interior of the sealing element 5 in the exhaust direction (positive x direction), wherein an inner diameter d5 is then formed in this connection A projection 6 is generated in the interior of the sealing element 5 for this, which results in the stepped transition from the inner diameter d4 to the inner diameter d5 in the embodiment.

The exhaust duct 3 then has a constriction 7 behind the sealing element 5 and thus also behind the larger cross-sectional surface A2. This constriction 7 is formed in a radially symmetric manner and designed in such a manner that the inner diameter of the exhaust duct is larger than the constriction 7 itself in front or behind thereof in the exhaust direction of the hydrogen. The exhaust duct has an inner diameter d6 at the constriction 7. The constriction 7 thus virtually represents an aperture which is formed in such a manner that the compressed gas reservoir is emptied in 2 to 10 minutes, preferably in 2 to 5 minutes.

The safety valve 1 further comprises a sealing and locking element 8, which is preferably formed in a cylindrical manner. The sealing and locking element 8 is preferably formed as a cylindrical glass capsule that is filled with a liquid. It serves to seal the exhaust duct 3, if an exhaust process is not necessary on the one hand, and keeps the sealing element 5 stable in a position and locks it therewith on the other hand. The sealing and locking element 8 is positioned in its starting position in such a manner that it largely extends in the interior of the sealing element 5, wherein it thereby abuts the stop or the projection 6, and abuts a housing wall 9 on the other hand with its opposite end.

The safety valve 1 further comprises a spring 10, which serves for the movement guide of the sealing element 5 during the exhaust process.

The exhaust duct 3 can be opened to the outside by moving the sealing element 5 in dependence on the operating phase in order to be able to exhaust hydrogen.

The constriction 7 is formed in the region of the side 11 of the safety valve 1 facing away from the compressed gas reservoir. At the high pressure side (thus, on the side 2 of the safety valve 1), a minimum mass flow is enabled by the bore or the section with the diameter d3 of the exhaust duct 3 in the end part 4 of the sealing element 5, and it is further avoided that a locking of the exhaust process occurs.

At the low pressure side (thus, on the side 11 of the safety valve 1), the mass flow of the hydrogen to be exhausted is also restricted during an exhaust process, namely through the aperture or constriction 7.

In a preferred manner, a constant mass flow is thus achieved during the exhaust process by means of these two essential measures, the bore with the inner diameter d3 and the constriction 7 with the inner diameter d6.

By means of the sealing element 5, which has differently dimensioned cross-sectional surfaces A1 and A2 at opposite sides, in particular in their size, a function of the pressure regulation is generated on the high and the low pressure side of the safety valve 1, wherein this preferably coincides in connection with the spring for the movement guide of the sealing element 5.

The following formula is valid in this connection:

$$A2 * p_L = D * x + A1 * p_H$$

wherein D represents the spring constant of the spring, x the spring-pre-tension in the x direction, $p_L$ the pressure of the hydrogen at the low pressure side, and $p_H$ the pressure of the hydrogen at the high pressure side. The surface relations of the cross-sectional surfaces A1 and A2 are preferably dimensioned in such a manner that the trem $A1 * p_H$ can be neglected.

In the following, the functional principle of the safety valve 1 is quickly explained, which operates on the basis of a pressure regulator. An essential point of the safety valve is that a pressure-dependent mass flow regulation is enabled by means of a bore or a section 12 of the exhaust duct 3 with an inner diameter d3 in the inlet region on the one hand and an aperture or a constriction 7 at the starting region, wherein the safety valve 1 operates on the basis of a pressure regulator in this connection.

The glass body or the glass capsule filled with liquid, which forms the sealing and locking element 8, locks the piston or the sealing element 5 in its initial or starting position according to the depiction in the FIGURE. Furthermore, it seals the through-flow against the environment. By means of an outer heat source, a temperature increase of the liquid in the interior of the sealing and locking element 8 is generated, as can for example occur with a safety-critical state in case of a fire, and the liquid heats and evaporates, whereby the sealing and locking element 8 is destroyed, in that it bursts. After such destruction, the sealing element 5 is pressed to the left by the pressure of the medium to be exhausted to the cross-sectional surface A1, and a pressure builds up in the left chamber 13. This acts on the left cross-sectional surface A2, which is considerably larger than the surface A1, and the sealing element 5 is moved to the right even with the relatively low pressure by means of this action of force. The spring 10 which can be adjusted to a desired pressure in the left chamber 13 by means of an adjusting nut, acts against this action of force.

A possible endangerment can be reduced considerably with an exhaust process by means of this stabilization of the mass flow that flows out even when igniting hydrogen gas that is flowing out. The outflow duration can furthermore be reduced towards the end of the outflow process, as a higher cross section can be opened.

Another possibility of use is the regulation of a gas mass flow with a variable primary pressure. This can be implemented with the suggested regulator, in that the locking element is foregone and flow-through is thus always open.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A safety valve for a compressed gas reservoir, said safety valve comprising:
   an exhaust duct, that is connectable to the compressed gas reservoir; and
   a sealing element, which is arranged to move within the exhaust duct and selectively opens the exhaust duct to the outside, depending on an operating phase; wherein,
   the sealing element has a greater cross-sectional area on a side facing away from the compressed gas reservoir than on a side facing the compressed reservoir;
   the exhaust duct has a constriction on a side of the sealing element that is remote from the compressed gas reservoir;
   the sealing element is held in its starting position in the case of no exhaust;
   a locking element extends into an interior of the sealing element in an assembly position;
   a first end of the locking element abuts a housing wall in a sealing element section of the exhaust duct;
   a second end of the locking element abuts the exhaust duct in a sealing manner at a projection of an inner wall, which is formed for reducing the flow cross section of the exhaust duct, such that the locking element thus simultaneously serves as a sealing and locking element.

2. The safety valve according to claim 1, wherein the constriction is formed in such a manner that the constricted cross section of the exhaust duct is greater than it is in front of and behind the construction.

3. The safety valve according to claim 1, wherein the constriction is dimensioned in such a manner that the compressed gas reservoir is emptied in 2 to 10 minutes.

4. The safety valve according to claim 1, wherein the constriction is dimensioned in such a manner that the compressed gas reservoir is emptied in 2 to 5 minutes.

5. The safety valve according to claim 1, wherein the constriction is formed in an exhaust direction of a medium, behind the sealing element in the exhaust duct.

6. The safety valve according to claim 1, wherein the exhaust duct has a section upstream of the constriction relative to a flow direction, which section has a flow cross section that is smaller than a flow cross section of the exhaust duct in front or behind the section.

7. The safety valve according to claim 6, wherein the section is formed as a bore in an end part of the sealing element facing the compressed gas reservoir.

8. The safety valve according to claim 7, wherein the flow cross section of the bore is dimensioned in such a manner that the compressed gas reservoir is emptied in 2 to 10 minutes.

9. The safety valve according to claim 7, wherein the flow cross section of the bore is dimensioned in such a manner that the compressed gas reservoir is emptied in 2 to 5 minutes.

10. The safety valve according to claim 8, wherein the end part has a smaller cross-sectional surface of the sealing element, which is greater than a surface of the flow cross section of the bore of the exhaust duct.

11. The safety valve according to claim 1, wherein the sealing element is a piston that can be displaced in the axial direction of the exhaust duct.

12. The safety valve according to claim 1, wherein the sealing and locking element is filled with a liquid.

13. The safety valve according to claim 1, wherein the sealing and locking element loses its sealing and locking function in dependence on a temperature change.

14. The safety valve according to claim 1, wherein the sealing and locking element is a cylindrical capsule of glass, which is filled with a liquid that evaporates at a high temperature.

15. The safety valve according to claim 1, wherein the sealing element is coupled to a pre-tensioned spring for the movement guide of the sealing element during an exhaust process.

16. The safety valve according to claim 1, wherein the compressed gas reservoir is configured to receive fuel for a fuel cell system.

* * * * *